United States Patent
DeRoo et al.

(10) Patent No.: US 7,069,397 B2
(45) Date of Patent: Jun. 27, 2006

(54) STREAM BASED MEMORY MANAGER WITH FUNCTION SPECIFIC HARDWARE LOGIC FOR ACCESSING DATA AS A STREAM IN MEMORY

(75) Inventors: John DeRoo, Hopkinton, MA (US); Steve Metzger, Harvard, MA (US); Paul Phillips, Westboro, MA (US); Brian Ramelson, Brighton, MA (US)

(73) Assignee: Sun Microsystems, Inc, Santa Clara, CA (US)

( * ) Notice: Subject to any disclaimer, the term of this patent is extended or adjusted under 35 U.S.C. 154(b) by 326 days.

(21) Appl. No.: 10/414,431

(22) Filed: Apr. 15, 2003

(65) Prior Publication Data

US 2004/0210725 A1    Oct. 21, 2004

(51) Int. Cl.
*G06F 12/00* (2006.01)
(52) U.S. Cl. .................. 711/154; 711/100; 365/221
(58) Field of Classification Search ............ 711/5, 711/119, 150–155, 213, 216; 709/203, 231–233
See application file for complete search history.

(56) References Cited

U.S. PATENT DOCUMENTS

| 5,490,113 | A | | 2/1996 | Goodwin et al. |
| 5,627,994 | A | | 5/1997 | Levy et al. |
| 5,737,565 | A | * | 4/1998 | Mayfield ............... 711/213 |
| 5,809,239 | A | * | 9/1998 | Dan et al. ............. 709/203 |
| 6,330,645 | B1 | * | 12/2001 | Harriman ............. 711/151 |
| 6,668,313 | B1 | * | 12/2003 | Koob et al. .......... 711/170 |
| 6,807,602 | B1 | * | 10/2004 | Hornung et al. ........ 711/5 |
| 2002/0002608 | A1 | * | 1/2002 | Aspromonte et al. .... 709/223 |
| 2002/0073218 | A1 | | 6/2002 | Aspromonte et al. |

FOREIGN PATENT DOCUMENTS

EP    0 993 225 A1    4/2000

* cited by examiner

*Primary Examiner*—Nasser Moazzami
(74) *Attorney, Agent, or Firm*—Lahive & Cockfield, LLP

(57) ABSTRACT

In one general aspect, a stream-based memory circuit is disclosed that includes physical storage elements and at least a first physical access port. A stream-based access controller is operatively connected to the physical storage elements and to the access port. The controller includes function-specific hardware logic operative to access data as streams in the physical memory in response to stream-based access commands at the access port.

36 Claims, 4 Drawing Sheets

STREAM BASED MEMORY MANAGER WITH FUNCTION SPECIFIC HARDWARE LOGIC FOR ACCESSING DATA AS A STREAM IN MEMORY

CROSS-REFERENCE TO RELATED APPLICATIONS

This application is related to copending applications entitled Secure Network Processing, application Ser. No. 10/414,459 and Object-Aware Transport-Layer Network Processing Engine, application Ser. No. 10/414,406, both filed on the same day as this application and herein incorporated by reference.

FIELD OF THE INVENTION

This application relates to stream-based storage units, which can provide stream-based storage services to one or more client circuits.

BACKGROUND OF THE INVENTION

A number of different types of storage hardware are now in use. These include sequential-access storage elements, such as shift registers and First-In-First-Out (FIFO) buffers, from which data are accessed in a particular order. Random-access storage elements, such as semiconductor random access memory (RAM), are also commonly used and differ from sequential-access storage elements in that they allow data to be accessed in any order. Some types of memory, such as burst-mode memory, combine attributes of both sequential and random-access memory. A few more complex hardware designs are also in use, such as Content-Accessible Memory (CAM) in which the contents of at least part of the memory itself can be used to access particular storage locations. Electrical engineers have used these types of storage in a wide variety of hardware systems, and software engineers have used them to manage more complex data structures, such as linked lists or trees.

SUMMARY OF THE INVENTION

In one general aspect, the invention features a stream-based memory circuit that includes a plurality of physical storage elements, and at least a first physical access port. A stream-based access controller is operatively connected to the physical storage elements and to the access port. The controller includes function-specific hardware logic operative to access data as streams in the physical memory in response to stream-based access commands at the first access port.

In preferred embodiments, the physical access port and the stream-based access controller can be implemented as part of a single integrated circuit. The circuit can include at least a second physical access port, with the stream-based access controller being also operatively connected to the second physical access port and with the controller including further hardware logic operative to access data as streams in the physical memory in response to stream-based access commands at the second access port. The hardware logic and the further hardware logic can be operative to process at least a part of each of the commands simultaneously. The stream-based access controller can be operative to communicate through the first and second physical access ports at a speed that is on the order of the maximum speed of the physical storage elements. The stream-based access controller can be operative to access data in a stream based on a stream identifier and an offset. The stream-based access controller can define a larger address space through the stream identifier and offset than it can access in the physical storage elements. The stream-based access controller can further include stream-splitting logic operative to split individual streams into smaller sets of streams. The stream-splitting logic can include page-level split-count management logic. The stream-splitting logic can be retroactively operative on an existing stream. The stream-based access controller can further include user-tracking circuitry operative to track users of streams and thereby prevent deallocation of memory for a stream that is still in use. The user-tracking circuitry can track both read-only users and extenders. The stream-based access controller can include logic operative to issue a notification through the first physical access port when a stream reaches a predetermined length. The physical access port can be a message port. The first physical access port can define a bulk channel for bulk data and a non-bulk channel for commands. The stream-based access controller can further include hashing logic. The circuit can further include page-based storage management logic operative to allocate and deallocate pages of memory for the streams. The stream-based access controller can have a memory space that is larger than that of the physical storage elements. The stream-based access controller can include logic operative to issue a notification through the first physical access port when a stream reaches a predetermined length.

In another general aspect, the invention features a stream-based memory circuit that includes a plurality of physical storage elements, at least a first physical access port, at least a second physical access port, and a stream-based access controller operatively connected to the physical storage elements and to the first and second access ports, wherein the controller includes logic operative to access data as streams in the physical memory in response to stream-based access commands at the first access port and to access data as streams in the physical memory in response to stream-based access commands at the second access port, wherein at least some of the accesses through the first access port are to a same stream as at least some of the accesses through the second access port.

In a further general aspect, the invention features a stream-based memory circuit that includes a plurality of physical storage elements, at least a first physical access port, and a stream-based access controller operatively connected to the physical storage elements and to the access port, wherein the controller includes logic operative to access data as streams in the physical memory in response to stream-based access commands at the first access port and stream-splitting logic operative to split individual streams into smaller sets of streams.

In preferred embodiments, the stream-splitting logic can include page-level split-count management logic. The stream-splitting logic can be retroactively operative on an existing stream.

In another general aspect, the invention features a stream-based memory circuit that includes a plurality of physical storage elements, at least a first physical access port, and a stream-based access controller operatively connected to the physical storage elements and to the access port, wherein the controller includes logic operative to access data as streams in the physical memory in response to stream-based access commands at the first access port and user-tracking circuitry operative to track numbers of users of streams and thereby prevent deallocation of streams in use. The user-tracking circuitry can track both read-only users and extenders.

In a further general aspect, the invention features a stream-based memory circuit that includes a plurality of physical storage elements, at least a first physical access port, and a stream-based access controller operatively connected to the physical storage elements and to the access port, wherein the controller includes logic operative to access data as streams in the physical memory in response to stream-based access commands at the first access port and logic operative to issue a notification through the first physical access port when a stream reaches a predetermined length.

In another general aspect, the invention features a stream-based memory circuit that includes a plurality of physical storage elements, at least a first physical access port that defines a bulk channel for bulk data and a non-bulk channel for commands, and a stream-based access controller operatively connected to the physical storage elements and to the access port, wherein the controller includes logic operative to access data as streams in the physical memory in response to stream-based access commands at the first access port.

In a further general aspect, the invention features a stream-based memory circuit that includes means for storing data, means for receiving stream-based requests, and means responsive to the means for storing data and to the means for receiving stream-based requests for accessing data as streams in means for storing in response to stream-based access commands received at the means for receiving.

Systems according to the invention are advantageous in that they can permit data streams to be readily accessed with stream-based commands. These capabilities can allow relatively simple hardware to manipulate data streams quickly and efficiently. This is particularly advantageous in systems that operate in real time on communications data because it can allow for rapid handling of data with a minimum amount of buffering. And by allowing streams to be split, systems using stream-based memory schemes according to the invention can handle small parts of a larger stream in any order, or even simultaneously.

Systems according to the invention are also advantageous in that they centralize data flow for a number of client circuits. Because the system is dedicated to stream-based access for a large number of client circuits, these circuits can read and write to common streams with very high overall throughput. This can drastically improve the performance of a complex data processing system.

The memory management of systems according to the invention can also allow for a larger number of streams and/or larger streams to be open than might otherwise be possible. Because physical memory in the tails of streams can be deallocated as streams are read, systems can offer a stream memory space that is larger than the physical memory space that is actually present. Clients can then safely use a total stream space larger than is actually physically available, as long as they are actively using the streams in that space and responsibly deallocating them.

It is even possible to provide for flow control mechanisms that prevent the stream space from exceeding the physical memory space by issuing flow control signals when streams reach a particular size. These mechanisms can also provide other benefits within a system, such as improved congestion control.

DETAILED DESCRIPTION OF AN ILLUSTRATIVE EMBODIMENT

Figure 1:
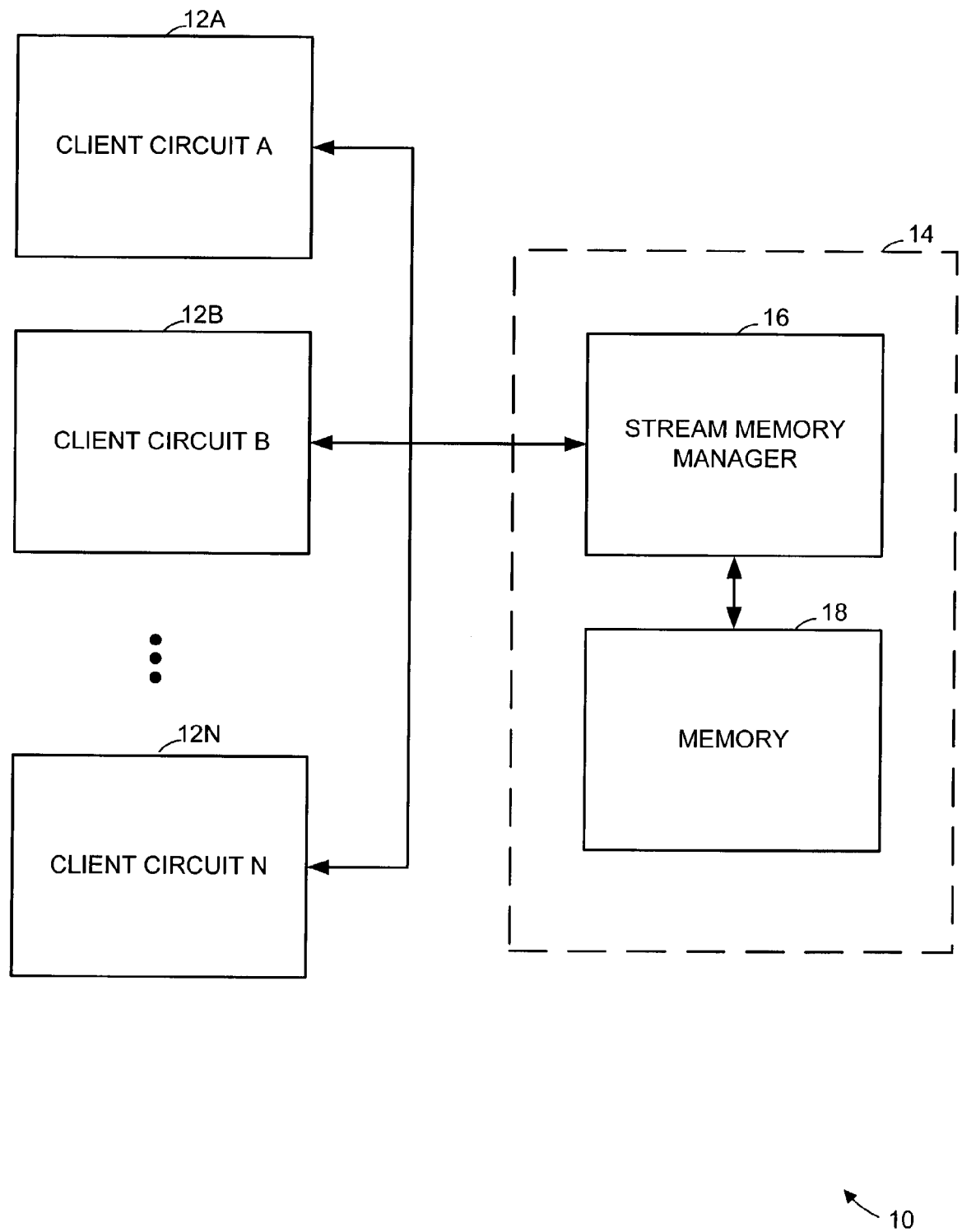
FIG. 1 is a block diagram of an illustrative system employing a stream memory manager according to the invention.

Referring to FIG. 1, an illustrative system 10 includes one or more client circuits 12A, 12B, . . . 12N, which are operatively connected to a stream storage unit 14. The client circuits and stream storage unit can be implemented as part of any type of system in which it is beneficial to be able to access data in stream format, such as communication systems, telemetry systems, data acquisition systems, or streaming audio or video systems. One type of communication system that can use a stream storage unit according to the invention is described in the application entitled "Object-Aware Transport-Layer Network Processing Engine" that is referenced above.

The stream storage unit can include a stream memory manager 16 operatively connected to memory 18, which can include a bank of RAM. In the embodiment presented, the stream memory manager and four client circuits are implemented within a set of Application-Specific Integrated Circuits (ASICs), which can be Field Programmable Gate Arrays (FPGAs), and the RAM is implemented as two channels of off-the-shelf Double Data Rate (DDR) RAM DIMMs totaling up to 64 GB. This arrangement is not a necessity to the invention, however, as the client circuits could be off-chip or even located remotely, for example, or the stream memory manager and memory could be implemented in a single chip, or broken down further.

The stream memory manager 16 presents a stream model to its clients. In this model, the clients can access memory using a Stream ID (SID) and Byte Sequence Numbers (BSNs). In the present embodiment, the SID is a number that is up to 24 bits long, and the BSN is a 32-bit number, so the total address space is up to 56 bits. This 56-bit address space can be served by an amount of physical memory having a significantly smaller address space, however, such as a 64 GB RAM bank with 36 bits of addressing. The stream memory manager can then map logical addresses (SID, BSN pairs) into physical addresses, as long as there is memory space available. The mapping can be managed through logic in the stream memory manager and data structures kept in the memory 18.

The most basic structure is the page. At initialization, the size of the page is set to be 1, 2, 4, or 8 Kilobytes. All of the pages that are not used for overhead structures are kept in a page heap. A physical page number indexes every page in the page heap, and those numbers are allocated through a resource manager. The mapping of logical page addresses to physical page numbers is recorded in a hash table. When a stream needs more storage, a request is made for a physical page ID. If one is granted, the SID, Logical Page ID (LPID), and Physical Page ID (PPID) are all recorded in an entry in a hash table. When the storage is no longer needed, the sequence is reversed. Each SID/LPID pair can have exactly one PPID value, but a single PPID may be associated with multiple SID/LPID pairs due to splitting. Each physical page also has associated with it a count that indicates the number of splits that are in that page.

Figure 2:
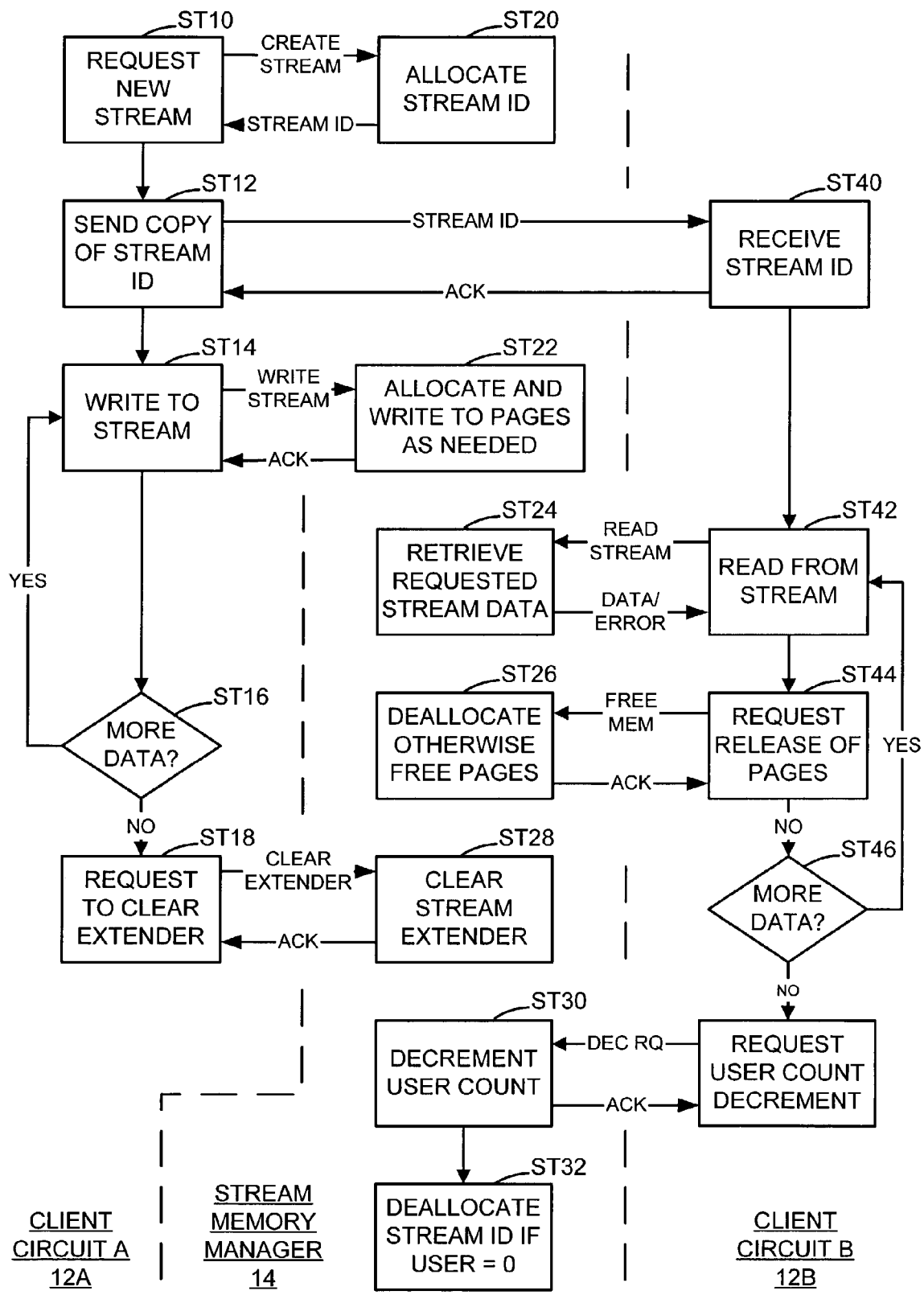
FIG. 2 is a flowchart illustrating the operation of the system of FIG. 1 for a simple transfer between a first client circuit and a second client circuit using the stream memory manager of FIG. 1.

In an illustrative example, referring to FIGS. 1–2, a first client circuit 12A can begin a transfer of data to a second client circuit 12B using the stream storage unit 14 by requesting a new stream (step ST10). This request takes the form of a create stream request message sent from the client circuit to the stream memory manager 16. The stream memory manager responds by allocating a stream ID and returning it to the client circuit (step ST20).

The first client circuit 12A can then send a message containing the stream ID it received from the stream memory manager 16 to a second client circuit 12B (step ST12), although it could also wait until after writing to the stream. The second circuit receives the stream ID and can acknowledge receipt of the stream ID in a return message (step ST40). No memory storage is allocated for the stream at this time. Note that although the stream ID is only transferred to one other client circuit in this example, the stream ID could also be transferred to other client circuits as well. For each such transfer, including the first, one of the circuits should increment a user count for the stream.

Once the stream ID has been allocated, the first client circuit 12A can begin writing data to the stream (ST14). This operation takes the form of a write stream message that includes a write stream command that specifies the amount of data to be sent followed by that data. The stream memory manager 16 then acknowledges receipt of this command, allocates pages in the memory 18 for the data, and stores the data in the allocated pages in the memory (step ST22). This process can be repeated as the first client circuit needs to store more data (step ST16).

Once the write had been acknowledged, the second client circuit 12B can begin reading from the stream by issuing a read stream command to the stream memory manager 16. The stream memory manager responds to this request with the data sought or an error message indicating why the data are not available. The second client circuit can also send a freemem message to request that any full pages in parts of the stream that it has already read be freed up (step ST44). If there are no other client circuits reading from the stream, the stream memory manager can free up any full pages that the freemem message applies to.

This read-and-release process can be repeated as the first client circuit 12A adds data to the stream, effectively allowing the data to be relayed from the first client circuit to the second client circuit 12B as they are received by the first client circuit. And if memory is released as it is read, the overall memory usage by this process is automatically kept low. It is of course also possible to allow reading and writing to take place in different ways, such as to cause a first client circuit to write an entire stream before a second circuit begins reading it. Multiple circuits can also read from the stream simultaneously, or in succession. In one preferred embodiment, however, surrounding circuitry dictates that only one circuit can write to the stream at a time.

The circuit that writes to a stream is called the stream's "extender." The stream memory manager 16 maintains a flag called the extender flag for each stream to signal the existence of an extender for that stream. The extender flag is set when the stream is created and can be cleared in response to a request by any circuit, although it is typically cleared by the circuit that requested its creation, when it is done writing to the stream (steps ST18, ST28). The stream memory manager cannot close a stream until the extender flag has been cleared.

When the second client circuit 12B decides to stop reading, or when it reaches the end of the stream (step ST46), it sends a user count decrement message to the stream memory manager 16. The stream memory manager 16 then acknowledges this request and decrements the user count (step ST30). If the second client circuit 12B was the only circuit that was designated as a user, the user count will drop from one to zero. And if the extender has also already been cleared, the stream memory manager deallocates the stream's ID and any pages that remain in use by the stream.

The stream memory manager 16 can also support the splitting of streams. This functionality allows a larger stream to be broken into smaller pieces, which can then be handled by separate entities. In this way, at least some of the pages in the streams can be deallocated as the different entities read them, instead of requiring that the later parts of a stream be kept allocated because a busy entity cannot make time to handle an early part of the stream. Stream splitting may even allow for the different streams to be processed simultaneously by different entities.

The stream memory manager 16 can also allow splits to occur retroactively. A stream can be written by a first entity, and its contents examined by a second entity. The stream can then be split into separate parts based on its contents, and these separate parts can be handled by other entities, which can be selected based on the contents of the stream itself. In parsing a packet-based communication stream, for example, different circuits can be selected to process fields within a received packet depending on the packet's type.

Figure 3:
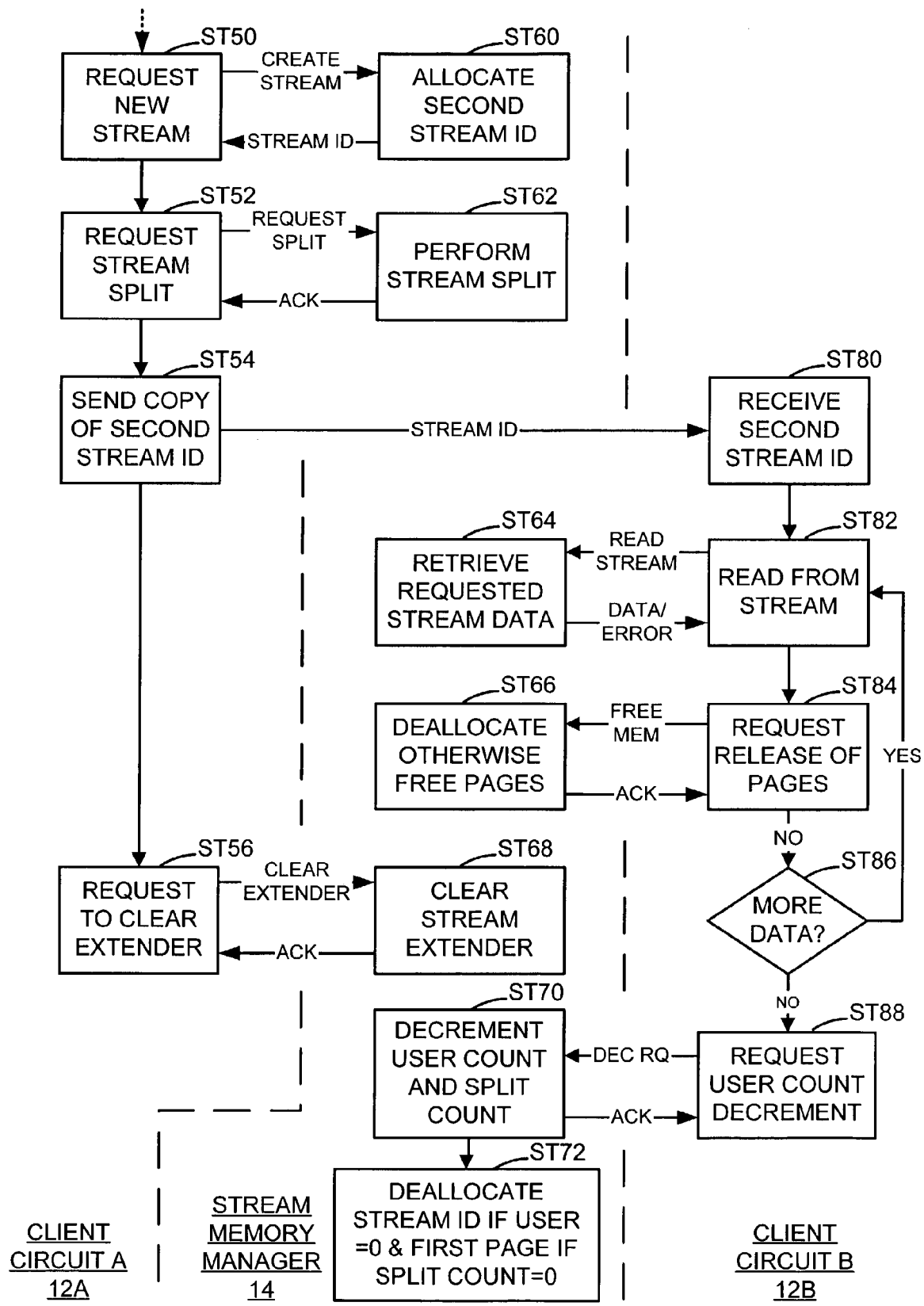
FIG. 3 is a flowchart illustrating the operation of the system of FIG. 1 for a simple transfer between a first client circuit and a second client circuit of a part of a stream using a second stream split from the first stream presented in FIG. 2.
Figure 4:
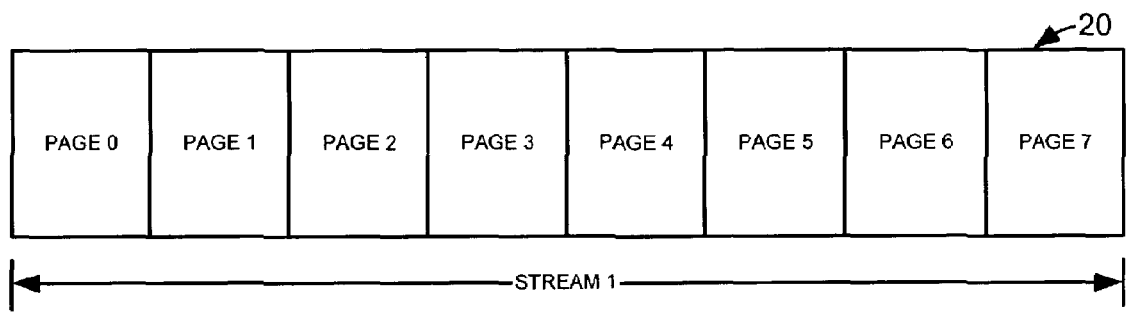
FIG. 4 is a data diagram of an eight-page-long stream before a split.
Figure 5:
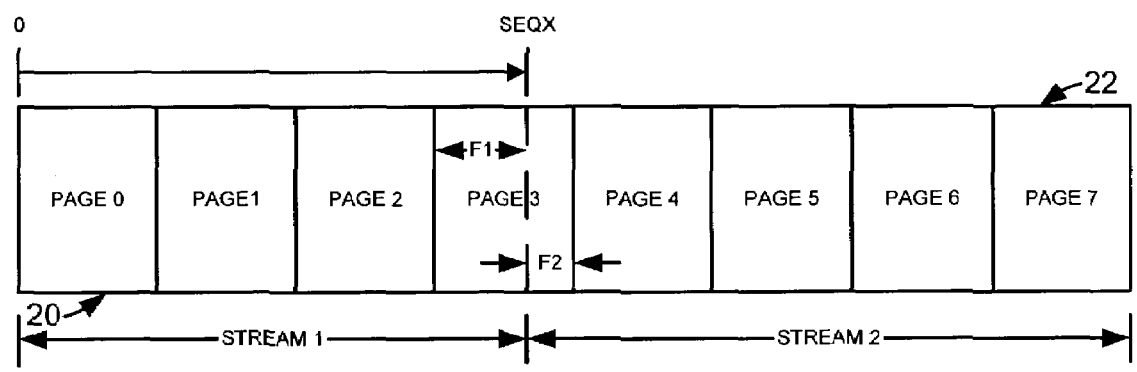
FIG. 5 is a data diagram of the eight-page-long stream of FIG. 4 after being split into two streams.

Referring to FIGS. 3–5, before splitting a first stream 20 that it has written to, an extender must first request a second stream ID (step ST50), which the stream memory manager 16 allocates and provides (step ST60). The extender can then split the first stream by sending a split stream command to the stream memory manager (step ST52). This command includes the stream ID of both the first stream 20 and the second stream 22 as well as a byte sequence number (SEQX) at which the split is to take place. The stream memory manager responds to this request by associating the second stream ID with the tail of the first stream and acknowledging the split command (step ST62).

The creation of a split usually involves incrementing the split count for the page in which the split occurs. The purpose of the split count is to prevent partial pages (e.g., PAGE 3) from being deallocated while they are still needed. This is because the part of the page F1 that is before the split still belongs to the first stream 20, while the part of the page F2 that is after the split belongs to the second stream 22, and the page should therefore only be deallocated when neither stream needs it. At the end of the split, the first stream's extender bit is cleared, and if the first stream's use count was already zero, the pages in the first stream are deallocated, except for the page in which the split occurred. Note that the split count is not incremented when a split occurs exactly on a page boundary, and that the system supports multiple splits within a page.

Split counts are associated with physical pages, and there is a single split count for each page. Extenders and user counts are associated with streams. If a single page's split count is greater than zero, therefore, it may have multiple extender values and user counts associated with the streams that reference it. This page can only be deallocated when its split count is zero and the stream with which it is associated has a user count of zero or one. The use count of one allows a single reader to clear as it goes. Note that if a freemem is requested in the second stream 22 but the first stream 20 is still attached to page 3 (i.e., page 3's split count is one) the page will remain allocated, but it will become inaccessable to the user of the second stream if and only if there is only one user of stream two. No matter what the value of the split or user count is, the stream memory manager 16 will return an OK status if the indicated sequence number is valid whether it actually freed the storage or not.

Once the stream is split, the first stream 20 cannot be extended, although it can be written to as long as the write does not extend beyond the location of the split. The first client circuit 12A can extend the second stream 22, however, until it splits the stream again or relinquishes the extender (step ST56, ST68). The second client circuit 12B can also read from the second stream (steps ST80, ST64, ST84, ST66) once it has received its ID from the first client circuit (steps ST54, ST80). Note that while in FIGS. 4 and 5 the stream is shown as being made up of series of sequentially numbered pages, these pages are simply allocated from the page heap and therefore do not need to be physically sequential within the memory 18.

The stream memory manager 16 is designed to operate robustly in a shared environment. To this end, the stream memory manager returns a result, acknowledgement, or error code for all messages, unless a client circuit explicitly indicates that none is needed. And if a command message requests multiple operations in a single request, the stream memory manager does nothing unless all of them are valid.

The stream memory manager 16 can also enforce subscriber boundaries that prevent client circuit requests associated with one subscriber ID from performing operations that modify streams associated with another subscriber ID. Although a variety of further protections could also be provided, such as ensuring that only the circuit that opens a stream is capable of clearing the extender, these protections can also be handled within the client circuits or by supervisory hardware and/or software.

The stream memory manager 16 can also allocate resources to different subscribers or groups. In a system with five subscribers, for example, the stream memory might guarantee one-tenth of the memory space and one-tenth of the available stream IDs to each subscriber. The remaining half of the resources would then be distributed on a first-come-first-served basis.

Resource allocation can also use the concept of groups. Groups are sub-units within subscribers. These can be assigned to different types of operations performed by a subscriber. For example, different groups could be used for incoming and outgoing tasks an individual subscriber. The resource allocation scheme could then allocate portions of the subscriber's quota to these two types of tasks.

A variety of other resource allocation schemes could be implemented in addition to or instead of the approach described above. Subscribers could each be given different minimum amounts, different maximum amounts, or even be allocated priorities, for example. And more complex application-specific schemes could also be implemented, with the appropriateness of the exact priority scheme depending on a number of design factors for a specific implementation.

In one embodiment, the stream memory manager 16 can provide for a "notify on free" command. This command allows a circuit to request that it be notified by the stream memory manager when the stream gets to be less than or equal to a length specified in the command. This size length could be reached because of freemem operations, from splits, or even from the stream being deleted. This mechanism can allow upstream processors to throttle their write operations if downstream processing is proceeding slowly. The stream memory manager can also enforce a gross limit on stream length to prevent unusual conditions or errors from using up large amounts of memory.

The data structures, functions, and conventions used to implement the functionality will now be discussed in more detail. The hash function and the hash table allow the logical addresses to be translated to physical addresses. The logical address is put through the hash function, which results in a hash address. The hash address is then used to index into the hash table to read a hash bucket that contains several hash table entries. The hash table entries in the has bucket can then be searched for the one that matches the desired address (or an empty one if allocating a new page).

Each hash bucket in the system is indexed by a key. Every Stream ID (SID) and Logical Page ID (LPID) combination maps to a key. Multiple SID/LPID combinations can map to the same key. The size of the table determines the size of the keys.

The SIDs, over time, will become well-mixed and should not have much in the way of sequentiality to them. The LPIDs, on the other hand, will be clustered mostly around low values, with some outliers that cycle all the way through the address space.

To generate the key, the width in bits of the key to be generated (keywidth) is selected (in the present embodiment this can be from 16 to 23 bits, inclusive). The order of the keywidth low order bits of the SID (in the present embodiment SIDs are 24 bits wide) is then reversed to create a value called keySid. Finally, the keySid is bitwise EXORed with the keywidth low order bits of the LPID (in the present embodiment the LPID can be from 19 to 22 bits, inclusive; for the case of a key that is wider than the LPID, the upper bits can be padded with zeros).

As an example, assume the bits of the SID are represented as:

```
ABCDEFGHIJKLMNOPQRSTUVWX
``` with "A" being the most significant bit of the SID and "X" the least significant. Assume the LPID is 20 bits wide and the bits are represented as:

```
abcdefghijklmnopqrst
``` with "a" being the most significant bit and "t" being the least significant. And assume the key is 22 bits wide.

```
keyWidth = 22

2211111111110000000000
           1098765432109876543210
  keySid = VUTSRQPONMLKJIHGFEDCBA
     key = (VUTSRQPONMLKJIHGFEDCBA) EXOR
           (00abcdefghijklmnopqrst)
```

Now assume the desired keywidth is 17 and all the other parameters are the same.

```
    keyWidth = 17

11111110000000000

65432109876543210 keySid = QPONMLKJIHGFEDCBA key = (QPONMLKJIHGFEDCBA) EXOR (defghijklmnopqrst)
```

It has been found that the hash lookups are potential bottlenecks. For this reason, it may be desirable to perform some pre-fetching and/or caching of the hash lookups to improve performance.

The split counts are maintained in a split count table. Each entry in this table is a 13-bit number that indicates the number of active splits that are current in a physical page. Only 13 bits are needed because splits can only occur between bytes, and since there can not be multiple splits between a contiguous pair of bytes, there can only be N-1 splits in a page, where N is the size in bytes of the page. Fewer than 13 bits are needed for page sizes less than 8 Kilobytes. When a logical page is freed in a stream, the split count of the corresponding physical page is decremented, and when it reaches zero the physical page is freed.

The page heap is simply all of the pages in memory that are not used for the tables described previously and in the following section. The heap begins with the page indicated by the a value called the "page heap base." The number of pages, and hence the length of the page heap, are indirectly specified by the number of pages the page manager is programmed to allocate.

Each possible stream ID is represented by an entry in a stream table in physical memory. The stream table begins at a page specified by a stream table base address and goes up from there. The system enforces a predefined maximum number of streams defined at power-up.

The messages between the client circuits and the stream memory manager are passed through one of a number of POS/PHY interfaces. Each of these interfaces provides a bulk channel and a non-bulk channel with interleaved time slots. This allows non-bulk messages (e.g., freemem) to pass while long reads or writes are taking place. The read stream command enters the stream memory manager on the non-bulk channel, for example, but its corresponding returned data exits on the bulk channel. Similarly, the write stream command enters the stream memory manager on the bulk channel, while its acknowledgement is returned on the non-bulk channel. Note that the split stream command also comes in on the bulk channel.

The flowcharts presented in this application are intended to illustrate the operation of one illustrative embodiment in particular circumstances. One of ordinary skill in the art will recognize that these flowcharts could be changed in a number of different ways, by reorganizing, exchanging, or even deleting some of their steps. The first client circuit 12A could write all of the data it intends to place in a stream, for example, before transferring its stream ID to the second client circuit 12B for reading (i.e., step ST12 could occur after step ST16).

Embodiments according to the invention are preferably implemented in dedicated, function-specific hardware to allow them to operate at the highest possible speed and/or degree of parallelism, as well as to allow for simultaneous access by multiple parties. To this end they can be implemented with dedicated integrated circuits, logic arrays, or field-programmable logic arrays. The present embodiment employs parallel hardware to service its three input ports, but stream processing is performed serially. Even with this arrangement, it has been found that overall throughput on each of the client circuit interfaces can be on the same order as that of the RAM used in the data bank.

The present invention has now been described in connection with a number of specific embodiments thereof. However, numerous modifications which are contemplated as falling within the scope of the present invention should now be apparent to those skilled in the art. It is therefore intended that the scope of the present invention be limited only by the scope of the claims appended hereto. In addition, the order of presentation of the claims should not be construed to limit the scope of any particular term in the claims.

What is claimed is:

1. A stream-based memory circuit, comprising:
A plurality of physical storage elements,
At least a first physical access port, and
A stream-based access controller operatively connected to the physical storage elements and to the at least first physical access port, wherein the controller includes function-specific hardware logic operative to access data as streams in the plurality of physical storage elements in response to stream-based access commands received at the at least first access port identifying one or more memory streams, and wherein the stream-based access controller further includes stream-splitting logic operative to split individual streams into smaller sets of streams.

2. The apparatus of claim 1 wherein the physical access port and the stream-based access controller are implemented as part of a single integrated circuit.

3. The apparatus of claim 1 further including at least a second physical access port and wherein the stream-based access controller is also operatively connected to the second physical access port and wherein the controller includes further hardware logic operative to access data as streams in the plurality of storage elements physical in response to stream-based access commands at the second access port.

4. The apparatus of claim 3 wherein the funtion-specific hardware logic and the further hardware logic are operative to process at least a part of each of the commands simultaneously.

5. The apparatus of claim 3 wherein the stream-based access controller is operative to communicate through the first and second physical access ports at a speed that is on the order of the maximum speed of the plurality of physical storage elements.

6. The apparatus of claim 1 wherein the stream-based access controller is operative to access data in a stream based on a stream identifier and an offset.

7. The apparatus of claim 6 wherein the stream-based access controller defines a larger address space through the stream identifier and offset than it can access in the plurality of physical storage elements.

8. The apparatus of claim 1 wherein the stream-splitting logic includes page-level split-count management logic.

9. The apparatus of claim 1 wherein the stream-splitting logic is retroactively operative on an existing stream.

10. The apparatus of claim 1 wherein the stream-based access controller further includes user-tracking circuitry operative to track users of streams and thereby prevent deallocation of memory for a stream that is still in use.

11. The apparatus of claim 10 wherein the user-tracking circuitry tracks both read-only users and extenders.

12. The apparatus of claim 1 wherein the stream-based access controller includes logic operative to issue a notification through the first physical access port when a stream reaches a predetermined length.

13. The apparatus of claim 1 wherein the first physical access port is a message port.

14. The apparatus of claim 1 wherein the first physical access port defines a bulk channel for bulk data and a non-bulk channel for commands.

15. The apparatus of claim 1 wherein the stream-based access controller further includes hashing logic.

16. The apparatus of claim 1 further including page-based storage management logic operative to allocate and deallocate pages of memory for the streams.

17. The apparatus of claim 1 wherein the stream-based access controller has a memory space that is larger than that of the physical storage elements.

18. The apparatus of claim 1 wherein the stream-based access controller includes logic operative to issue a notification through the first physical access port when a stream reaches a predetermined length.

19. A stream-based memory circuit, comprising:
a plurality of physical storage elements,
at least a first physical access port,
at least a second physical access port, and
a stream-based access controller operatively connected to the plurality of physical storage elements and to the first and second access ports, wherein the controller includes logic operative to access data as streams in the plurality of storage elements physical in response to stream-based access commands at the first access port and to access data as streams in the plurality of storage elements physical in response to stream-based access commands at the second access port, wherein at least some of the accesses through the first access port are to a same stream as at least some of the accesses through the second access port.

20. A stream-based memory circuit, comprising:
a plurality of physical storage elements,
at least a first physical access port, and
a stream-based access controller operatively connected to the plurality of physical storage elements and to the access port, wherein the controller includes logic operative to access data as streams in the plurality of storage elements physical in response to stream-based access commands at the first access port and stream-splitting logic operative to split individual streams into smaller sets of streams for use by multiple entities.

21. The apparatus of claim 20 wherein the stream-splitting logic includes page-level split-count management logic.

22. The apparatus of claim 20 wherein the stream-splitting logic is retroactively operative on an existing stream.

23. A stream-based memory circuit, comprising:
a plurality of physical storage elements,
at least a first physical access port, and
a stream-based access controller operatively connected to the plurality of physical storage elements and to the access port, wherein the controller includes logic operative to access data as streams in the plurality of storage elements physical in response to stream-based access commands at the first access port and user-tracking circuitry operative to track numbers of users of streams and thereby prevent deallocation of streams associated with a user.

24. The apparatus of claim 23 wherein the user-tracking circuitry tracks both read-only users and extenders.

25. A stream-based memory circuit, comprising:
a plurality of physical storage elements,
at least a first physical access port, and
a stream-based access controller operatively connected to the plurality of physical storage elements and to the access port, wherein the controller includes logic operative to access data as streams in the plurality of storage elements physical in response to stream-based access commands at the first access port and logic operative to issue a notification through the first physical access port when a stream reaches a predetermined length identified in a request from a requester.

26. A stream-based memory circuit, comprising:
a plurality of physical storage elements,
at least a first physical access port that defines a bulk channel for bulk data and a non-bulk channel for commands, and
a stream-based access controller operatively connected to the physical storage elements and to the access port, wherein the controller includes logic operative to access data as streams in the physical memory in response to stream-based access commands at the first access port.

27. In an electronic device, a method of managing and storing streaming data, comprising:
allocating memory based on request from a first client for a stream;
returning a stream ID to the first client and the first client forwarding the stream ID to a second client;
receiving the streaming data from the first client;
storing the streaming data in the allocated memory; and
forwarding the data upon receipt of a request from the second client.

28. The method of claim 27, further comprising providing a stream model to the first client.

29. The method of claim 27, wherein allocating memory comprises allocating pages in memory for holding data.

30. The method of claim 27, wherein the first client forwards the streaming data one of contemporaneous with, and successive to, the second client requesting to read the streaming data.

31. The method of claim 27, further providing a plurality of clients requesting to read the streaming data.

32. The method of claim 27, further comprising the second client sending a user decrement message when the second client has stopped reading the streaming data.

33. The method of claim 27, further comprising splitting the streaming data into multiple parts that can be handled separately.

34. The method of claim 27, wherein allocating memory further comprises guaranteeing a selected percentage of memory and maintaining a remaining percentage of memory for immediate memory demands.

35. The method of claim 27, wherein the electronic device comprises a stream-based memory circuit.

36. The method of claim 35, wherein the stream-based memory circuit communicates through a first access port and a second access port.

* * * * *